US012706363B2

(12) United States Patent
Tanobe

(10) Patent No.: US 12,706,363 B2
(45) Date of Patent: Aug. 11, 2026

(54) HIGH-FREQUENCY LINE CONNECTION STRUCTURE

(71) Applicant: NTT, Inc., Tokyo (JP)

(72) Inventor: Hiromasa Tanobe, Tokyo (JP)

(73) Assignee: NTT, INC., Tokyo (JP)

( * ) Notice: Subject to any disclaimer, the term of this patent is extended or adjusted under 35 U.S.C. 154(b) by 159 days.

(21) Appl. No.: 18/691,845

(22) PCT Filed: Sep. 29, 2021

(86) PCT No.: PCT/JP2021/035813
§ 371 (c)(1),
(2) Date: Mar. 13, 2024

(87) PCT Pub. No.: WO2023/053255
PCT Pub. Date: Apr. 6, 2023

(65) Prior Publication Data
US 2024/0275014 A1 Aug. 15, 2024

(51) Int. Cl.
*H01P 3/06* (2006.01)
*H01P 3/08* (2006.01)
*H01P 3/16* (2006.01)

(52) U.S. Cl.
CPC ................ *H01P 3/06* (2013.01); *H01P 3/081* (2013.01); *H01P 3/16* (2013.01)

(58) Field of Classification Search
CPC ............... H01P 3/06; H01P 3/081; H01P 3/16
USPC .......................................................... 333/245
See application file for complete search history.

(56) References Cited

FOREIGN PATENT DOCUMENTS

JP 2008010673 A 1/2008
JP 2020005018 A 1/2020

OTHER PUBLICATIONS

JP 2020005018 English Translation (Year: 2018).*
Camerlo et al., "Improving Signal Integrity of System Packaging by Back-Drilling Plated Through Holes in Board Assembly," 2004 Electronic Components and Technology Conference, Jun. 4, 2004, pp. 1220-1226. As discussed in the specification.
Douville et al., "Experimental Sutdy of Symmetric Microstrip Bends and Their Compensation," IEEE Transactions on Microwave Theory and Techniques, vol. MTT-26, No. 3, Mar. 1978, pp. 175-182. As discussed in the specification.

* cited by examiner

*Primary Examiner* — Andrea Lindgren Baltzell
*Assistant Examiner* — Abigail Amir Yaldo
(74) *Attorney, Agent, or Firm* — Slater Matsil, LLP

(57) ABSTRACT

A high-frequency line connecting structure includes microstrip lines, and a connecting part which bends an extension direction of the line at a place where the microstrip lines are connected. Spaces from which the substrate is removed are formed on the inner peripheral side and the outer peripheral side of the connecting part. The total volume of the space on the inner peripheral side is smaller than the total volume of the space on the outer peripheral side.

10 Claims, 20 Drawing Sheets

HIGH-FREQUENCY LINE CONNECTION STRUCTURE

CROSS-REFERENCE TO RELATED APPLICATIONS

This application is a national phase entry of PCT Application No. PCT/JP2021/035813, filed on Sep. 29, 2021, which application is hereby incorporated herein by reference.

TECHNICAL FIELD

The present invention relates to a high-frequency line connecting structure which connects high-frequency lines having different extension directions.

BACKGROUND

In an example of construction of an optical communication network characterized by high speed and broadband, a large number of modules such as a broadband high-frequency amplifier and an optical transceiver are being introduced. A large number of high-frequency lines capable of transmitting high-frequency signals with low loss and low reflection loss are mounted inside and outside these modules with a relatively high density. These high-frequency lines are rarely constituted only by a straight type wiring shape without bending in the same horizontal plane. In recent years, with acceleration of three-dimensional component mounting inside and outside the module, the wiring shape of the high-frequency line is becoming more complicated.

On the other hand, in a conventionally used technique, when the high-frequency line formed in the same plane is bent at right angles, for example, chamfering of the right-angled bent part of a microstrip line is widely performed (see NPL 1). With the chamfering processing, it is possible to suppress an effective impedance reduction of the high-frequency line due to expansion of a metal area at the bent part. It is widely known that the low reflection loss characteristics of the high-frequency signal at the bent part can be obtained from the impedance reduction suppression effect, and desired impedance matching over the entire high-frequency line including the bent part can be obtained.

Further, the high-frequency line which connects different modules or components in the module is not necessarily formed only in the same plane as described above. In order to improve the degree of freedom of wiring design of high-frequency lines, there are also many cases in which the high-frequency lines are formed via connecting structures between different layers. Many discussions have been made mainly on stub structures in the inter-layer connection on rigid substrates. It is widely known that the high-frequency characteristics are improved by shortening the length of the stub (see NPL 2).

If a thickness of an insulating layer constituting a microstrip line is 30 μm or 100 μm, a bent line width finally obtained by the chamfering process does not approach the manufacturing limit. However, in the case of high-density and high-frequency wiring such as a re-distributed layer (RDL) which has appeared in recent years, the thickness of the insulating layer is reduced to about several μm, and accordingly, the width of the microstrip line tends to approach a region close to the manufacturing limit of several μm.

In a high density wiring such as an RDL, it is assumed that introduction of a chamfered structure to the bent part of the high-frequency line may exceed a manufacturing limit. Therefore, the characteristic impedance matching at the bent part is not easy.

In the current product base using an RDL, a bit rate of the high-frequency signal propagating through the high-frequency line is within several Gbps. Further, a line length of the high-frequency line in the RDL is also a value shorter than an in-tube wavelength of the high-frequency signal in the present situation. Therefore, the above-mentioned characteristic impedance mismatching is not widely recognized as a problem at the present stage. However, at the time of extension of the high-frequency line length due to broadband in the future and enlargement of the area of the RDL, there is a possibility that the mismatching of the characteristic impedance at the bent part of the high-frequency line will be inevitable.

In the case of the interlayer connecting structure, even if the length of the stub is set to zero, it is not necessarily sufficient for the bandwidth in the future. This is because, when the high-frequency line is bent in different directions in the three-dimensional space, an effective capacitance is developed in the bent region, and the characteristic impedance is lowered, as in the case of bending the microstrip line in the two-dimensional plane.

When a high-frequency line embedded in a multilayer insulator is bent for connection between different layers, a pseudo coaxial line structure is generally introduced. When the chamfered structure introduced into the bent part of the microstrip line in the same plane is applied to the pseudo coaxial line structure, it is necessary to reduce a diameter of a center conductor of the pseudo coaxial line penetrating between layers. However, because there is a manufacturing limit for making the center conductor thinner, an ideal structure cannot necessarily be obtained, and there is naturally a limit to characteristic impedance matching at the bent part.

CITATION LIST

Non Patent Literature

NPL 1 Rene J. P. Douville, David S. James, "Experimental study of symmetric microstrip bends and their compensation," IEEE Transactions on Microwave Theory and Techniques, Vol. MTIT-26, No. 3, March 1978

NPL 2 S. Camerlo, et al., "Improving signal integrity of system packaging by back-drilling plated through holes in board assembly," Proceedings, 54th ECTC, June 2004

SUMMARY

Technical Problem

Embodiments of the present invention have been made to solve the above problems, and an object thereof is to realize matching of characteristic impedance, and perform transmission of a high-frequency signal without reflection, in a high-frequency line connecting structure which connects tips of high-frequency lines having different extension directions.

Solution to Problem

A high-frequency line connecting structure of embodiments of the present invention includes a first high-frequency line formed on a surface of a substrate or in the substrate made of an insulator or a semi-insulating semiconductor; a second high-frequency line formed on the surface of the substrate or in the substrate and having an extension direction different from that of the first high-frequency line; and a connecting part which bends an extension direction of the line at a place where the first high-frequency line and the second high-frequency line are connected, in which a space from which the substrate is removed is formed only on an outer peripheral side of the connecting part or on both an inner peripheral side and the outer peripheral side of the connecting part, and a total volume of the space on the inner peripheral side when the space is formed on both the inner peripheral side and the outer peripheral side of the connecting part is smaller than a total volume of the space on the outer peripheral side.

In a configuration example of the high-frequency line connecting structure of embodiments of the present invention, when the number of the spaces on the inner peripheral side when the spaces are formed on both the inner peripheral side and the outer peripheral side of the connecting part is defined as M (M is an integer of 1 or more), and the number of the spaces on the outer peripheral side is defined as N (N is an integer of 1 or more), a relationship M≤N is satisfied.

In a configuration example of the high-frequency line connecting structure of embodiments of the present invention, the first high-frequency line and the second high-frequency line are both formed in the substrate having a multilayer structure, the first high-frequency line is formed in a specific layer in the substrate, and the second high-frequency line is formed to penetrate a plurality of layers in the substrate.

In a configuration example of the high-frequency line connecting structure of embodiments of the present invention, the space is formed to be in contact with a ground plane formed in the substrate around a signal line of at least one of the first high-frequency line and the second high-frequency line, or formed at a position adjacent to the ground plane via the substrate, and functions as a capacitive adjustment part.

In a configuration example of the high-frequency line connecting structure of embodiments of the present invention, the space is formed to be in contact with the signal line around the signal line of at least one of the first high-frequency line and the second high-frequency line or is formed at a position adjacent to the signal line via the substrate, and functions as an inductive adjustment unit.

In a configuration example of the high-frequency line connecting structure of embodiments of the present invention, the first high-frequency line and the second high-frequency line are any one of a microstrip line, a coplanar line, and a strip line.

In a configuration example of the high-frequency line connecting structure of embodiments of the present invention, the first high-frequency line is a strip line, and the second high-frequency line is a pseudo-coaxial line which is made up of a signal via formed to penetrate a plurality of layers in the substrate, a ground plane formed to surround the signal via, and the substrate that fills a gap between the signal via and the ground plane.

In a configuration example of the high-frequency line connecting structure of embodiments of the present invention, the space on the inner peripheral side of the connecting part is formed to be in contact with a ground plane formed in the substrate around both signal lines of the first high-frequency line and the second high-frequency line, or is formed at a position adjacent to the ground plane via the substrate, and the space on the outer peripheral side of the connecting part is formed to be in contact with the signal line of the first high-frequency line, and is formed at a position adjacent to the signal line of the second high-frequency line via the substrate.

In a configuration example of the high-frequency line connecting structure, inside of the space is filled with an insulator having a relative dielectric constant smaller than the relative dielectric constant of the substrate or a semi-insulating semiconductor having a relative dielectric constant smaller than the relative dielectric constant of the substrate.

In a configuration example of the high-frequency line connecting structure of embodiments of the present invention, when the space is formed on both the inner peripheral side and the outer peripheral side of the connecting part, the dielectric constant of the insulator or the semi-insulating semiconductor filled in the space on the outer peripheral side is smaller than the dielectric constant of the insulator or the semi-insulating semiconductor filled in the space on the inner peripheral side.

Advantageous Effects of Embodiments of Invention

According to embodiments of the present invention, a connecting part for bending an extension direction of the line is provided at a place where the first high-frequency line and the second high-frequency line are connected, a space from which the substrate is removed is formed only on the outer peripheral side of the connecting part, or on both the inner and outer peripheral sides of the connecting part, and a total volume of the space on the inner peripheral side when the space is formed on both the inner peripheral side and the outer peripheral side of the connecting part is made smaller than the total volume of the space on the outer peripheral side. Thus, in embodiments of the present invention, matching of characteristic impedance is realized, and transmission of a high-frequency signal can be performed smoothly without reflection, at a connecting part that connects the first high-frequency line and the second high-frequency line and in the vicinity thereof.

DETAILED DESCRIPTION OF ILLUSTRATIVE EMBODIMENTS

A high-frequency line connecting structure according to an example of the present invention will be described below.

First Example

Figure 1:
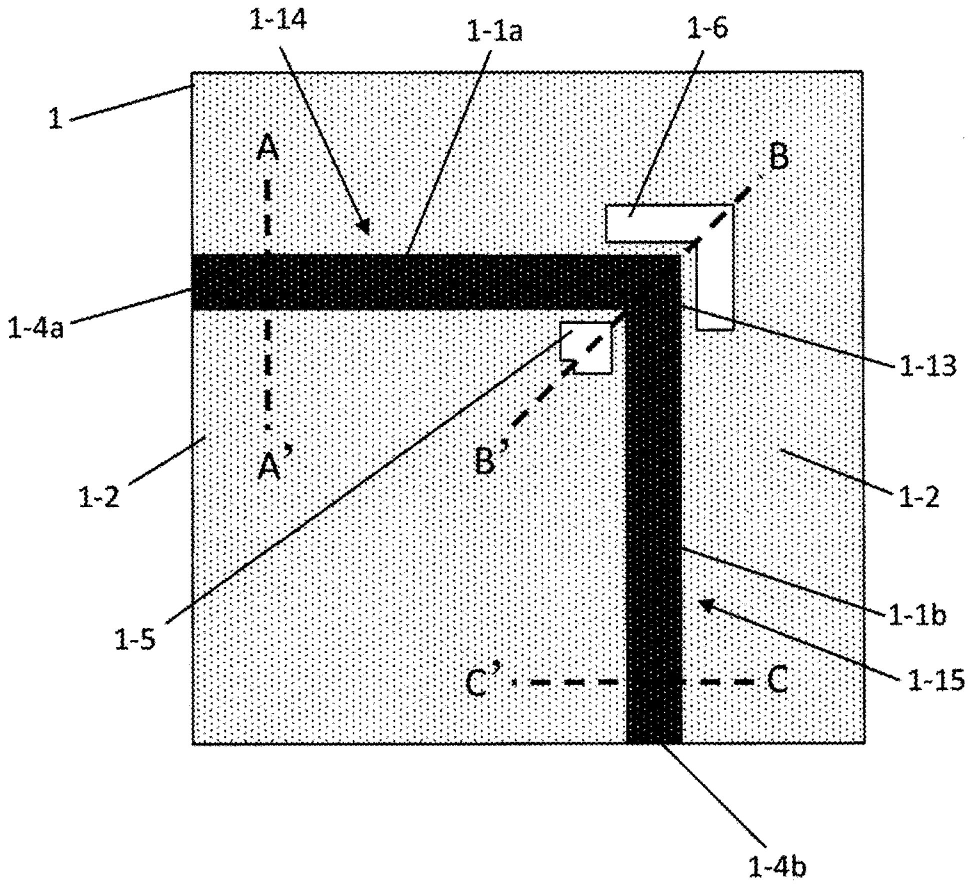
FIG. 1 is a plan view showing a configuration of a high-frequency line connecting structure according to a first example of the present invention.
Figure 2A:
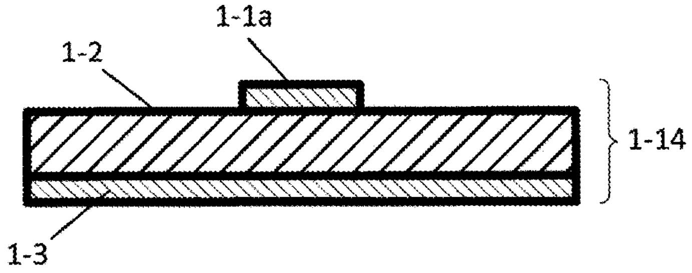
FIG. 2A is a cross-sectional view showing the configuration of the high-frequency line connecting structure according to the first example of the present invention.
Figure 2B:
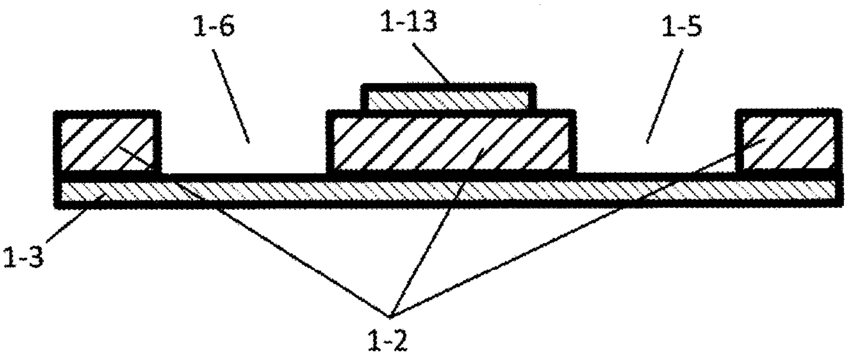
FIG. 2B is a cross-sectional view showing the configuration of the high-frequency line connecting structure according to the first example of the present invention.
Figure 2C:
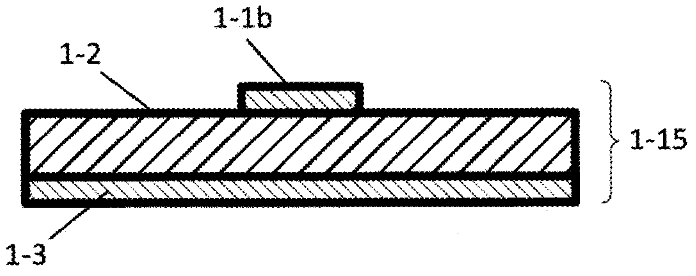
FIG. 2C is a cross-sectional view showing the configuration of the high-frequency line connecting structure according to the first example of the present invention.

First, a high-frequency line connecting structure 1 according to the first example of the present invention will be described with reference to FIGS. 1, 2A, 2B and 2C. FIG. 1 is a plan view of the high-frequency line connecting structure 1, FIG. 2A is a cross-sectional view of as line A-A' of FIG. 1, FIG. 2B is a cross-sectional view of a line B-B' of FIG. 1, and FIG. 2C is a cross-sectional view of a line C-C' of FIG. 1.

The high-frequency line connecting structure 1 is provided with two microstrip lines 1-14 and 1-15. The microstrip line 1-14 (first high-frequency line) is made up of a substrate 1-2 made of an insulator, a signal line 1-1*a* made of a conductor formed on a surface of the substrate 1-2, and a ground plane 1-3 made of a conductor formed on a back side of the substrate 1-2. As the material of the substrate 1-2, for example, alumina ceramics is used.

The microstrip line 1-15 (second high-frequency line) is made up of a substrate 1-2, a signal line 1-1*b* made of a conductor formed on the surface of the substrate 1-2, and a ground plane 1-3.

Since the extension directions of the signal line 1-1*a* and the extension direction of the signal line 1-1*b* are different from each other, a connecting part 1-13 for bending the extension direction of the line is required at a place where the signal line 1-1*a* and the signal line 1-1*b* are connected.

In this example, the extension direction of the line is bent at a right angle at the connecting part 1-13, but spaces 1-5 and 1-6 from which the substrate 1-2 is removed from the surface to the ground plane 1-3 are formed in the substrate 1-2 on an inner peripheral side and the substrate 1-2 on an outer peripheral side of the connecting part 1-13, respectively. The inside of the spaces 1-5 and 1-6 is filled with air or an inert gas such as $N_2$. As will be described later, an insulator or a semi-insulating semiconductor may be filled in the spaces 1-5 and 1-6.

A total volume of the space 1-5 on the inner peripheral side is formed to be smaller than a total volume of the space 1-6 on the outer peripheral side. In this way, by providing the spaces 1-5 and 1-6 in this example, the impedance reduction caused by the increase of the electric capacitance developed at the connecting part 1-13 of the signal lines 1-1*a* and 1-1*b* can be suppressed, and the matching of the characteristic impedance can be realized over the entire microstrip lines 1-14 and 1-15. As a result, in the high-frequency line connecting structure 1, a high-frequency signal can be transmitted without loss between signal line ends 1-4*a* and 1-4*b* of the microstrip lines 1-14 and 1-15.

Figure 3:
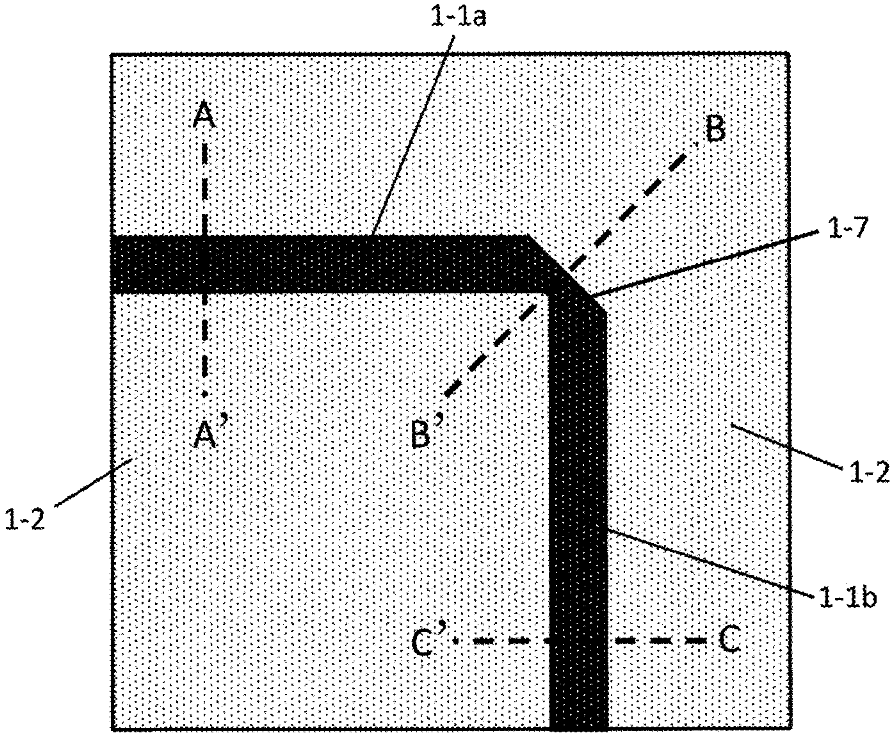
FIG. 3 is a plan view of a conventional microstrip line.
Figure 4A:
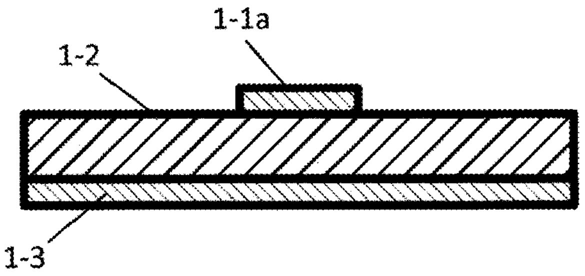
FIG. 4A is a cross-sectional view of the conventional microstrip line.
Figure 4B:
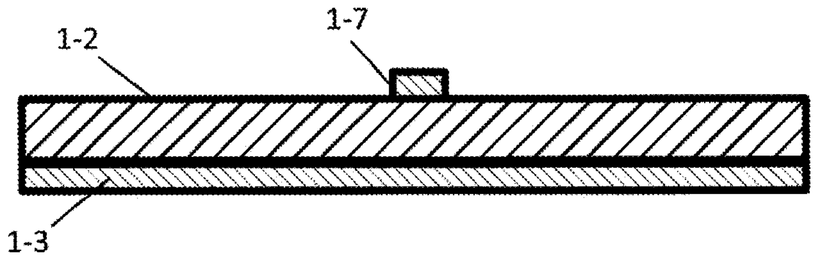
FIG. 4B a cross-sectional view of the conventional microstrip line.
Figure 4C:
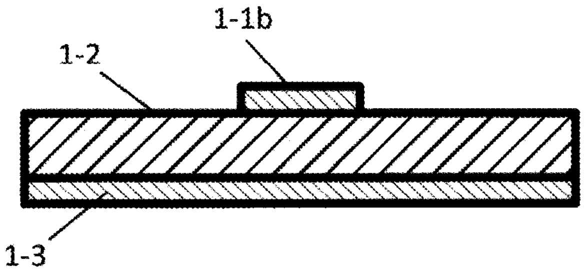
FIG. 4C is a cross-sectional view of the conventional microstrip line.

On the other hand, as a method of characteristic impedance matching which does not depend on this example, a method of physically processing a structure of an apex of the connecting part (bent part) has been proposed and known, and is widely used in various application destinations. FIG. 3 is a plan view of a conventional microstrip line disclosed in NPL 1. FIG. 4A is a cross-sectional view cut along the line A-A' of FIG. 3, FIG. 4B is a cross-sectional view cut along line B-B; of FIG. 3, and FIG. 4C is a cross-sectional view cut along line C-C' of FIG. 3.

As shown in FIG. 3, according to NPL 1, by chamfering the apex 1-7 of the connecting part of the signal lines 1-1*a* and 1-1*b*, the increase in the electric capacitance can be suppressed. However, the RDL in which the thickness of the base 1-2 is several μm or the wiring width on the package substrate in which the thickness is several tens μm has already been close to the manufacturing limit, and even if a photomask capable of chamfering is used, it is difficult to process the apex of the connecting part into a desired shape.

Further, there is a problem that the signal line may be disconnected in some cases by chamfering the connecting part. Therefore, it is not always appropriate to apply the technique disclosed in the NPL 1 to the leading field such as RDL over the future.

On the other hand, according to this example, by a very simple and easily practicable structure in which spaces 1-5 and 1-6 are provided in the substrate 1-2 on the outer peripheral side and the inner peripheral side of the connecting part 1-13 of the signal lines 1-1*a* and 1-1*b*, matching of characteristic impedance can be obtained over all the microstrip lines 1-14 and 1-15, and the high-frequency signal can be transmitted without loss.

In this example, the microstrip lines 1-14 and 1-15 have been described as examples, but this example may be applied to a coplanar line in which a ground plane is formed around the signal lines 1-1*a* and 1-1*b*.

Second Example

Figure 5:
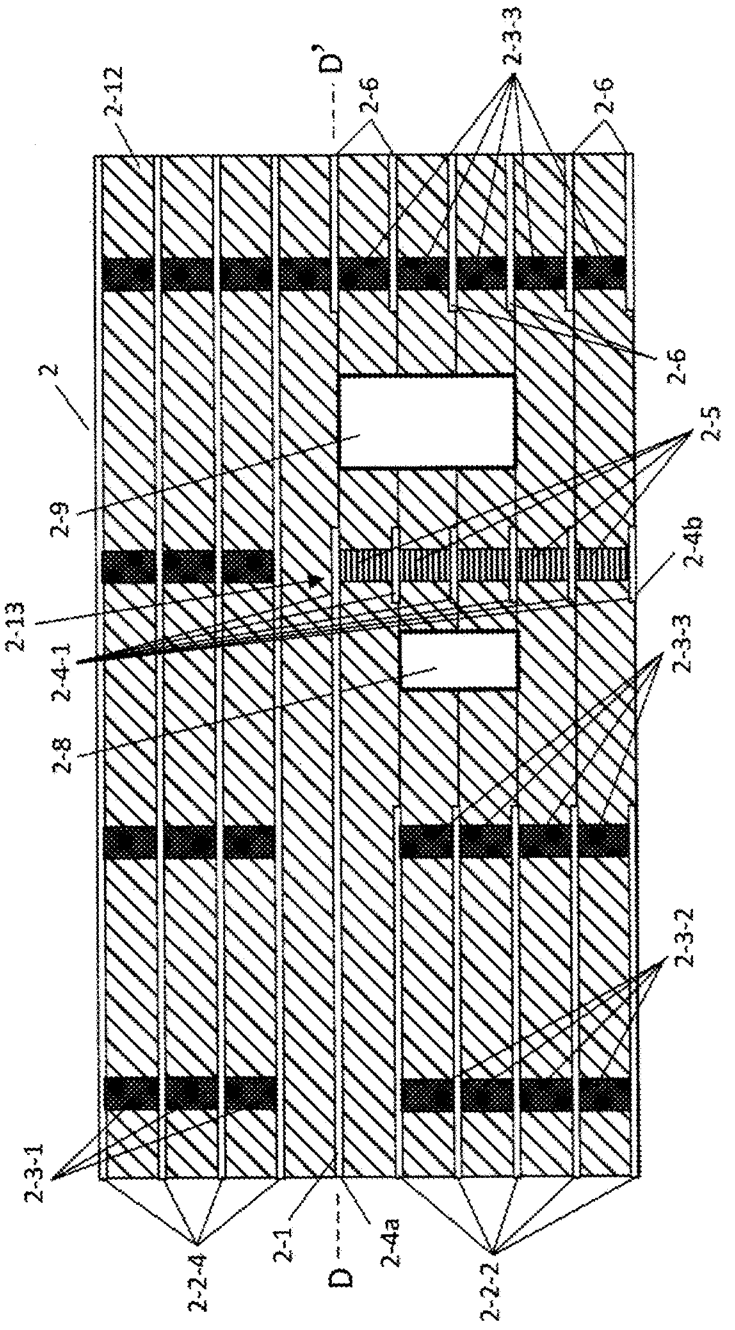
FIG. 5 is a cross-sectional view showing a configuration of a high-frequency line connecting structure according to a second example of the present invention.
Figure 6:
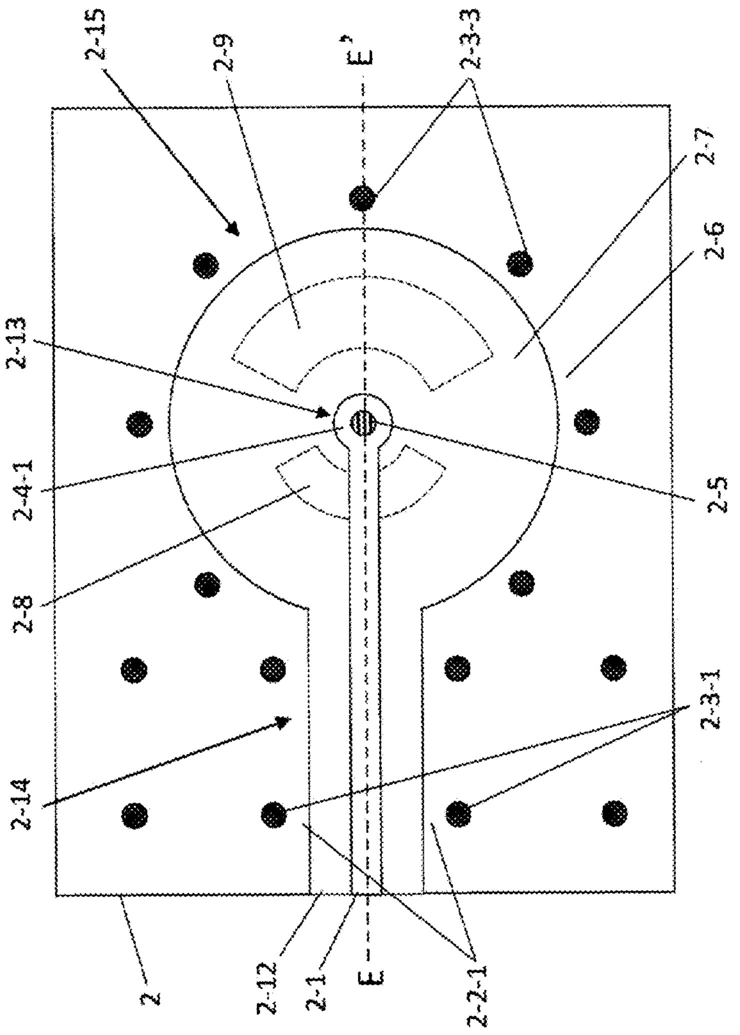
FIG. 6 is a cross-sectional view showing the configuration of the high-frequency line connecting structure according to the second example of the present invention.
Figure 7:
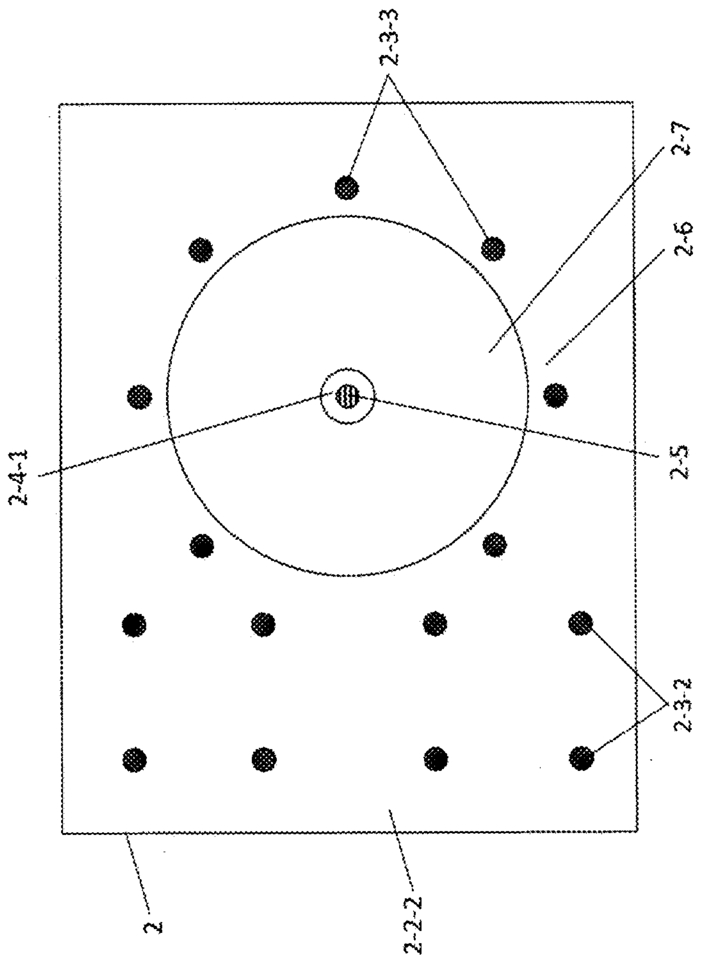
FIG. 7 is a cross-sectional view showing the configuration of the high-frequency line connecting structure according to the second example of the present invention.

Next, a high-frequency line connecting structure 2 according to a second example of the present invention will be described with reference to FIGS. 5 to 7. FIG. 5 is a cross-sectional view of the high-frequency line connecting structure 2, and FIG. 6 is a cross-sectional view of the high-frequency line connecting structure 2 cut along a plane parallel to a layer (the layer at a position of line D-D' of FIG. 5) in which the signal line 2-1 is formed. FIG. 7 is a bottom view of the high-frequency line connecting structure 2. FIG. 5 shows a cross-section of the high-frequency line connecting structure 2 taken at a position of a line E-E' of FIG. 6.

Although the above-described first example is an example of the bending structure of the high-frequency line in the same two-dimensional plane, this example is an example in a three-dimensional space.

The high-frequency line connecting structure 2 is provided with two high-frequency signal lines, specifically, a coplanar strip line 2-14 (first high-frequency line) and a pseudo coaxial line 2-15 (second high-frequency line).

The coplanar strip line 2-14 includes a signal line 2-1 made of a conductor formed in a substrate 2-12 made of an insulator, a ground plane 2-2-1 made of a conductor formed in right and left substrates 2-12 of the signal line 2-1, ground planes 2-2-4 and 2-2-2 made of a plurality of layers of conductors formed in the upper and lower substrates 2-12 of the signal line 2-1, a ground via 2-3-1 made of a conductor formed in the substrate 2-12 to interlayer-connect the plurality of layers of ground planes 2-2-1 and 2-2-4, and a ground via 2-3-2 made of a conductor formed in the substrate 2-12 to interlayer-connect the plurality of layers of ground planes 2-2-1 and 2-2-2. As the material of the substrate 2-12, for example, alumina ceramics is used.

The pseudo coaxial line 2-15 includes a signal pad 2-4-1 made of a conductor formed in the substrate 2-12 to be connected to the signal line 2-1 and a plurality of layers of conductors therebelow, a signal via 2-5 made of a conductor formed in the substrate 2-12 to interlayer-connect the plurality of layers of signal pads 2-4-1, a ground plane 2-6 made of the plurality of layers of conductors formed in the substrate 2-12 around signal pad 2-4-1 on the same layer as the plurality of layers of the ground planes 2-2-1 and 2-2-2, an anti-pad region 2-7 from which the ground plane 2-6 is selectively removed and which is a region filled with the substrate 2-12, and a ground via 2-3-3 made of a conductor formed in the substrate 2-12 to interlayer-connect the plurality of layers of the ground plane 2-6. A signal via 2-5 vertically penetrating the substrate 2-12 corresponds to the center conductor of the pseudo coaxial line 2-15.

Here, the pseudo coaxial line means a structure similar to a coaxial line which is provided with a ground plane 2-6 having an insulator (substrate 2-12) on the outer periphery of the signal via 2-5 and having a circular shape of a boundary with the insulator, and a ground via 2-3-3 for electrically connecting each ground plane 2-6.

The coplanar strip line 2-14 extends in the horizontal direction, and the pseudo coaxial line 2-15 extends in the vertical direction. Therefore, when the end of the coplanar strip line 2-14 and the end of the pseudo coaxial line 2-15 are electrically and physically connected, a connecting part 2-13 for bending the extension direction of the line is required at a place where the signal line 2-1 and the signal via 2-5 are connected.

The direction of the line is bent at a right angle at the connecting part 2-13, but a space 2-8 from which the substrate 2-12 is removed is formed in the substrate 2-12 on the inner peripheral side of the connecting part 2-13. A space 2-9 from which the substrate 2-12 is removed is formed on the substrate 2-12 on the outer peripheral side of the connecting part 2-13. The inside of the spaces 2-8 and 2-9 is filled with air or an inert gas such as $N_2$. As will be described later, the inside of the spaces 2-8 and 2-9 may be filled with an insulator or a semi-insulating semiconductor.

The total volume of the space 2-8 on the inner peripheral side is formed to be smaller than the total volume of the space 2-9 on the outer peripheral side. The diameter of the signal via 2-5 that forms the pseudo coaxial line 2-15 is sufficiently larger than the conductor thickness of the signal line 2-1 that forms the coplanar strip line 2-14. Therefore, in this example, it is possible to suppress the reduction in impedance due to the increase in the electrical capacitance developed in the connecting part 2-13.

Further, the space 2-8 on the inner peripheral side of the connecting part 2-13 functions as an inductive adjustment part of the signal line 2-1 of the coplanar strip line 2-14, and functions as a broadband adjustment part of a reflection frequency of a high-frequency signal by LC resonance generated in the connecting part 2-13.

Therefore, in this example, it is possible to suppress an impedance reduction due to an increase in the electrical capacitance developed in the connecting part 2-13, and at the same time, to realize broadband of the reflection frequency of a high-frequency signal due to LC resonance generated in the connecting part 2-13, and to realize matching of the characteristic impedance over the entire coplanar strip line 2-14, the connecting part 2-13 and the pseudo coaxial line 2-15. As a result, in the high-frequency line connecting structure 2, a high-frequency signal can be transmitted without loss between the signal line end **2-4*a* of the coplanar strip line 2-14 and the signal line end 2-4*b* of the pseudo coaxial line 2-15**.

Figure 8:
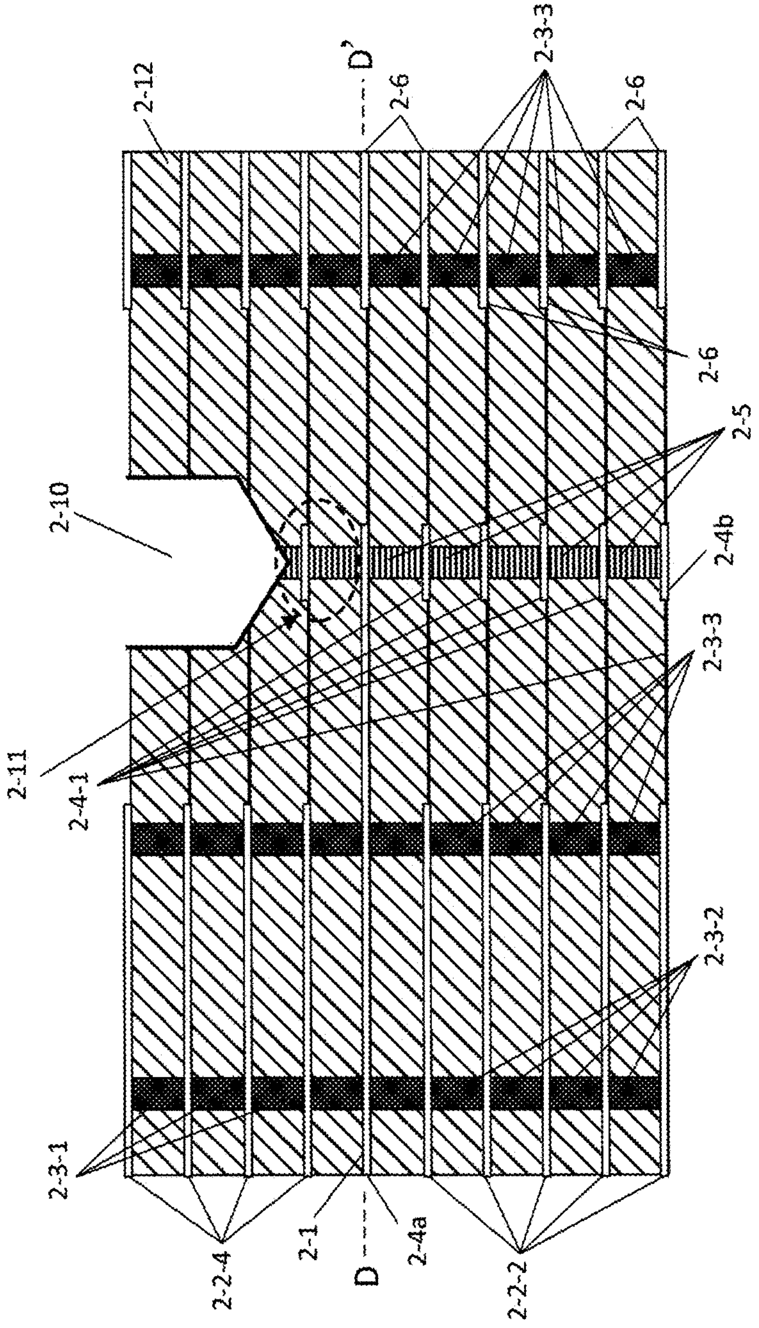
FIG. 8 is a cross-sectional view showing the configuration of a conventional high-frequency line connecting structure.
Figure 9:
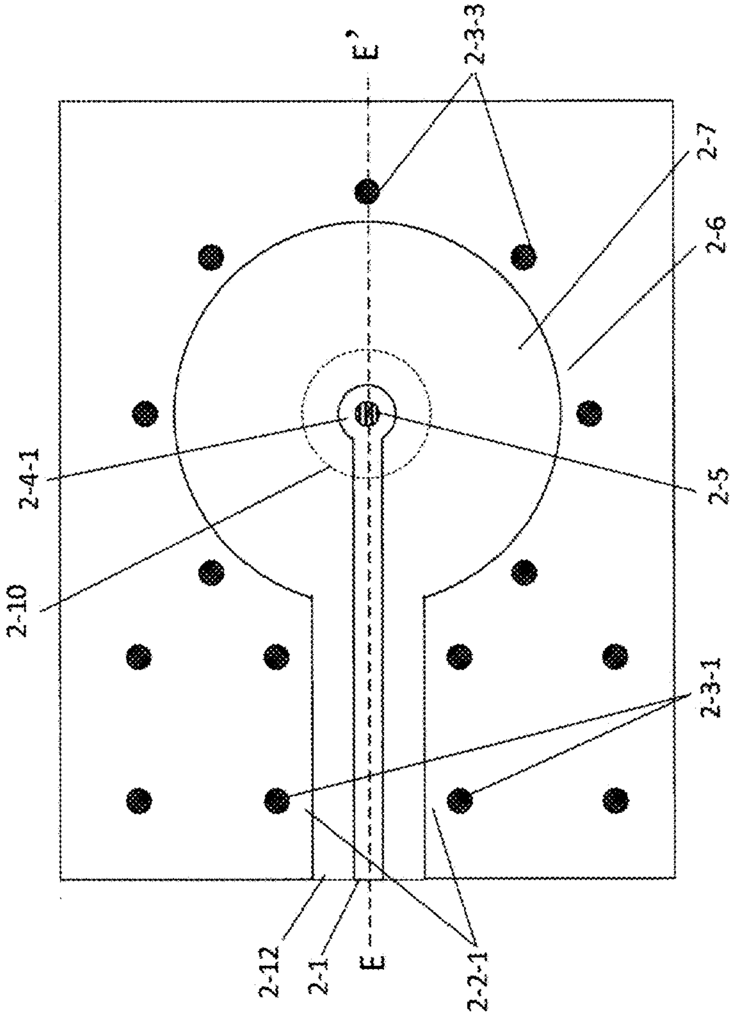
FIG. 9 is a cross-sectional view showing the configuration of the conventional high-frequency line connecting structure.
Figure 10:
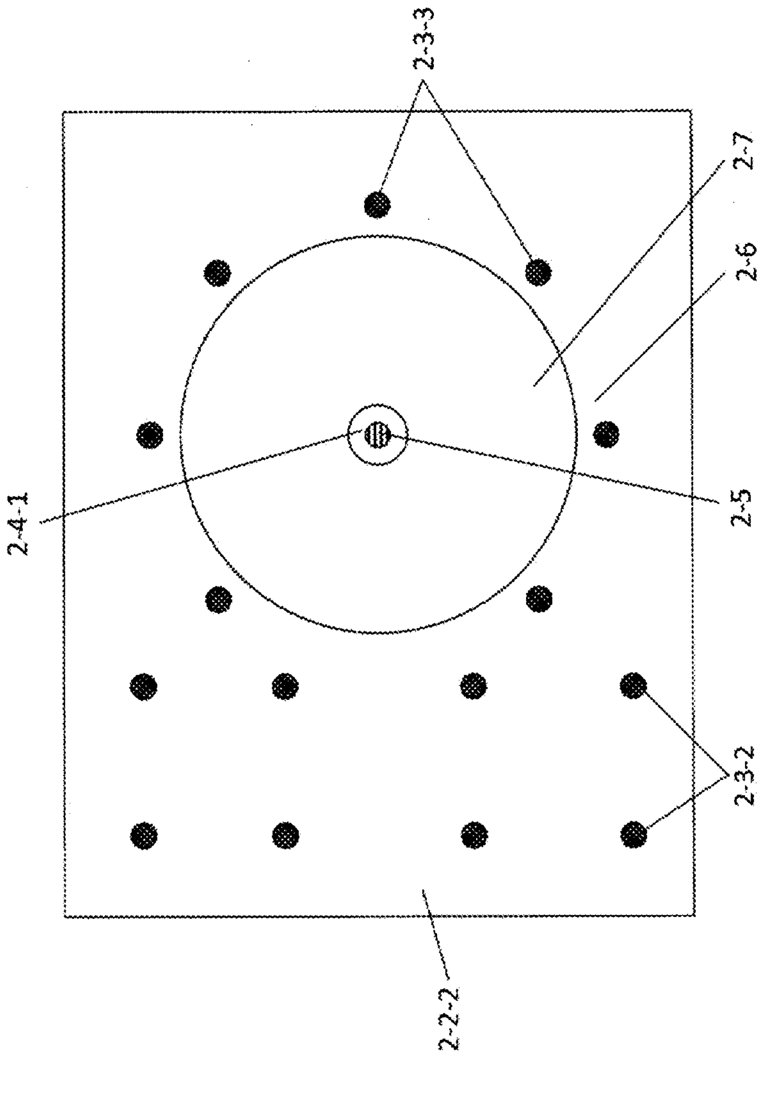
FIG. 10 is a bottom view showing the configuration of the conventional high-frequency line connecting structure.

On the other hand, as a method of characteristic impedance matching which does not depend on this example, a method of physically processing the structure of the apex of the connecting part has been proposed and known, and is widely used in various application destinations. FIG. 8 is a cross-sectional view of a conventional high-frequency line connecting structure disclosed in NPL 2. FIG. 9 is a cross-sectional view of the high-frequency line connecting structure of FIG. 8, which is cut along a plane parallel to the layer (the layer at the position of the line D-D' of FIG. 8) on which the signal line 2-1 is formed. FIG. 10 is a bottom view of the high-frequency line connecting structure of FIG. 8. FIG. 8 shows a cross-section of the high-frequency line connecting structure cut at the position of the line E-E' of FIG. 9.

As shown in FIG. 8, according to the NPL 2, the signal via 2-5 and the signal pad 2-4-1 of the pseudo coaxial line are removed from the outside by machining to suppress the occurrence of the electrical capacitance and the electrical induction. The feature of the technique disclosed in NPL 2 is that the space 2-10 formed by a back drill mark and a stub region 2-11 partially left exist.

Even if the machining accuracy disclosed in NPL 2 is improved, it is not easy to set the stub region 2-11 to zero. Because of the presence of the electric length in the stub region 2-11, it is not possible to avoid signal reflection at a frequency corresponding to a quarter of the wavelength of the signal in the tube. Therefore, in optical communication applications using a baseband frequency from the vicinity of Direct Current (DC) to over 100 GHz which has been increasing in recent years, there has also appeared a case where the technique disclosed in NPL 2 is difficult to apply.

On the other hand, according to this example, the matching of the characteristic impedance can be obtained over all of the coplanar strip line 2-14 and the pseudo coaxial line 2-15 by a very simple and easy-to-implement structure of providing the spaces 2-8 and 2-9 in the substrate 2-12 on the outer peripheral side and the inner peripheral side of the connecting part 2-13, and the high-frequency signal can be transmitted without loss.

Third Example

Figure 11:
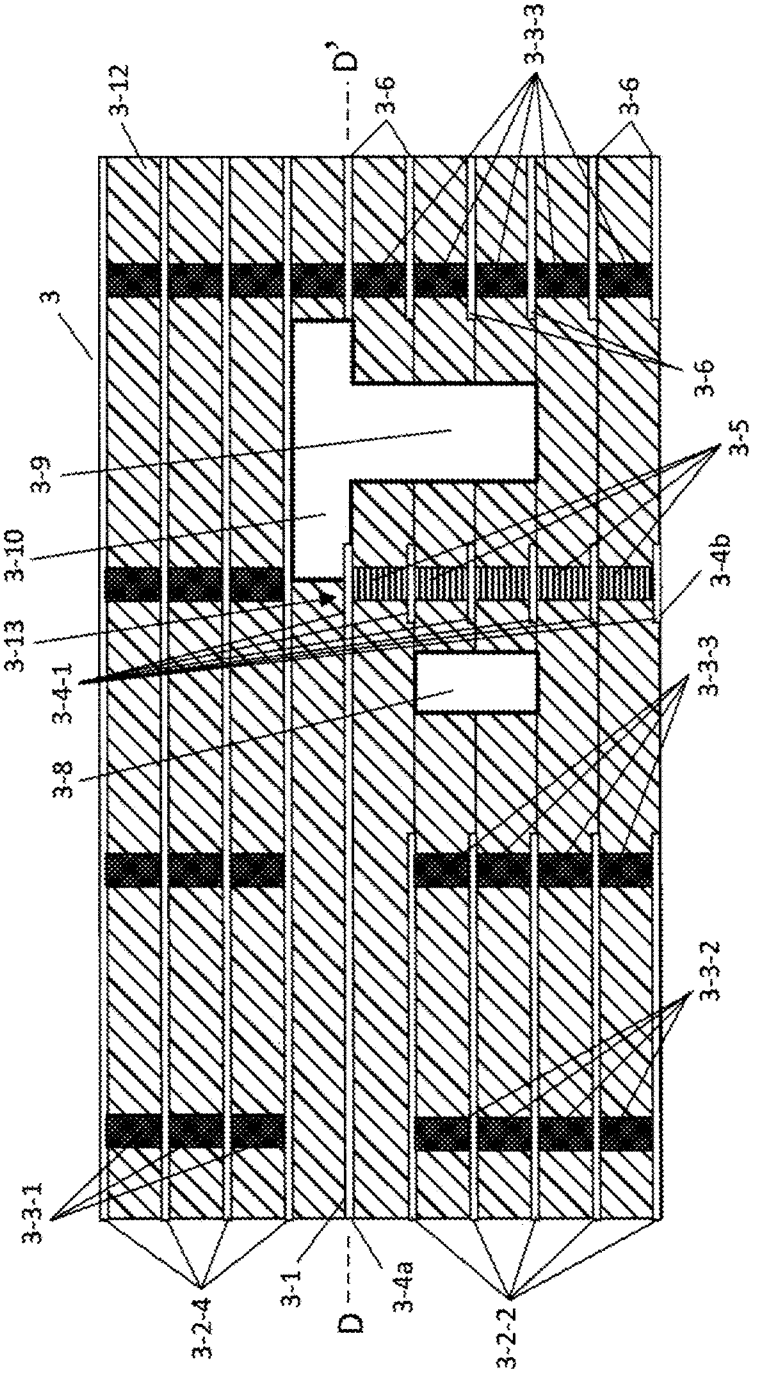
FIG. 11 is a cross-sectional view showing a configuration of a high-frequency line connecting structure according to a third example of the present invention.
Figure 12:
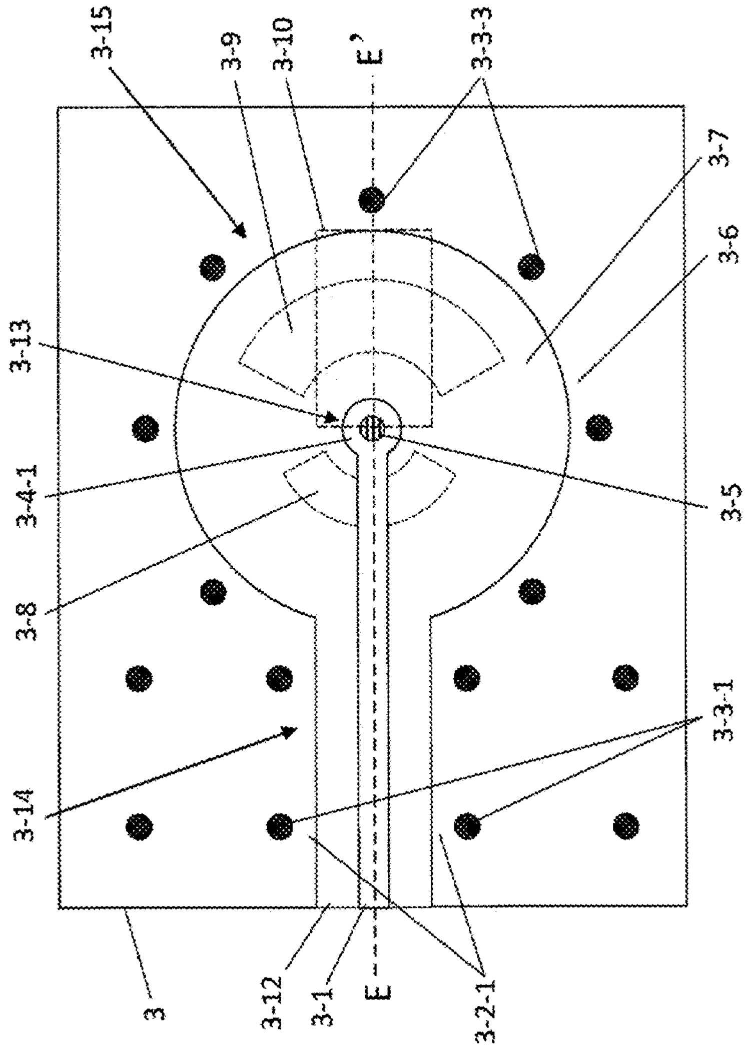
FIG. 12 is a cross-sectional view showing the configuration of the high-frequency line connecting structure according to the third example of the present invention.
Figure 13:
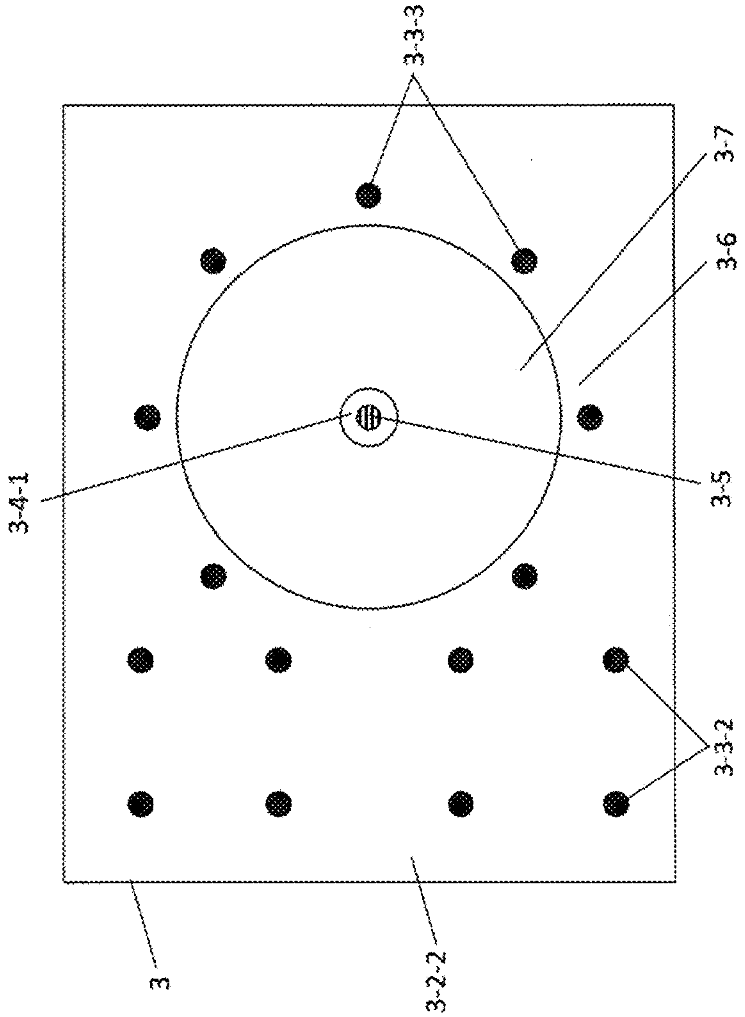
FIG. 13 is a bottom view showing the configuration of the high-frequency line connecting structure according to the third example of the present invention.

A high-frequency line connecting structure 3 according to a third example of the present invention will be described with reference to FIGS. 11 and 13. FIG. 11 is a cross-sectional view of the high-frequency line connecting structure 3, FIG. 12 is a cross-sectional view of the high-frequency line connecting structure 3 cut along a plane parallel to a layer (a layer at a position of a line D-D' of FIG. 11) on which the signal line 3-1 is formed, and FIG. 13 is a bottom view of the high-frequency line connecting structure 3. FIG. 11 shows a cross-section of the high-frequency line connecting structure 3 cut at the position of the line E-E' of FIG. 12.

The high-frequency line connecting structure 3 includes two high-frequency signal lines, specifically, a coplanar strip line 3-14 (second high-frequency line) and a pseudo coaxial line 3-15 (second high-frequency line).

The coplanar strip line 3-14 includes a signal line 3-1 made of a conductor formed in a substrate 3-12 made of an insulator, ground planes 3-2-1 made of a conductor formed in the right and left substrates 3-12 of the signal line 3-1, ground planes 3-2-4 and 3-2-2 made up of a plurality of layers of conductors formed in the substrate 3-12 above and below the signal line 3-1, a ground via 3-3-1 formed in the substrate 3-12 to interlayer-connect the plurality of layers of ground planes 3-2-1 and 3-2-4, and a ground via 3-3-2 made of a conductor formed in the substrate 3-12 to interlayer-connect the plurality of layers of ground planes 3-2-1 and 3-2-2 to each other. As the material of the substrate 3-12, for example, alumina ceramics is used.

The pseudo coaxial line 3-15 includes a signal pad 3-4-1 made of a conductor formed in the substrate 3-12 to be connected to the signal line 3-1 and a plurality of layers of conductors thereunder, a signal via 3-5 made of a conductor formed in the substrate 3-12 to interlayer-connect the plurality of layers of signal pads 3-4-1, a ground plane 3-6 made of a plurality of layers of conductors formed in the substrate 3-12 around the signal pad 3-4-1 of the same layer as the plurality of layers of ground planes 3-2-1 and 3-2-2, an anti-pad region 3-7 from which the ground plane 3-6 is selectively removed and which is a region filled with the substrate 3-12, and a ground via 3-3-3 made of a conductor formed in the substrate 3-12 to interlayer-connect a plurality of layers of the ground planes 3-6. A signal via 3-5 vertically penetrating the substrate 3-12 corresponds to a center conductor of the pseudo coaxial line 3-15.

The coplanar strip line 3-14 extends in the horizontal direction, and the pseudo coaxial line 3-15 extends in the vertical direction. Therefore, when the end of the coplanar strip line 3-14 and the end of the pseudo coaxial line 3-15 are electrically and physically connected, a connecting part 3-13 that bends the extension direction of the line is required at a place where the signal line 3-1 and the signal via 3-5 are connected.

In the second example described above, the upper portion of the region from the coplanar strip line 3-14 to the connecting part 2-13 is filled with the substrate 2-12, and there is no space.

On the other hand, in this example, a space 3-8 from which the substrate 3-12 is removed is formed in the substrate 3-12 on the inner peripheral side of the connecting part 3-13. A space 3-9 from which the substrate 3-12 is removed is formed in the substrate 3-12 on the outer peripheral side of the connecting part 3-13.

Further, in this example, a space 3-10 is formed in which the substrate 3-12 above the signal pad 3-4-1 connected to the signal line 3-1 is removed. A part of the signal pad 3-4-1 is exposed in the space 3-10. The inside of the spaces 3-8 to 3-10 is filled with air or an inert gas such as $N_2$. Further, an insulator or a semi-insulating semiconductor may be filled in the spaces 3-8 to 3-10 as described later.

The total volume of the space 3-8 on the inner peripheral side is formed to be smaller than the total volume of the spaces 3-9 and 3-10 on the outer peripheral side. In the examples of FIGS. 11 and 12, the spaces 3-9 and 3-10 are formed to communicate with each other, but the spaces 3-9 and 3-10 may be formed not to communicate with each other.

In this example, by removing not only the substrate 3-12 around the signal via 3-5 but also the substrate 3-12 above the signal pad 3-4-1 connected to the signal line 3-1, it is possible to further suppress the impedance reduction due to the increase in the electrical capacitance developed at the connecting part 3-13, and at the same time, to realize broadband of the reflected frequency of the high-frequency signal due to the LC resonance that occurs at the connecting part 3-13. Thus, it is possible to realize matching of characteristic impedance over the whole of the coplanar strip line 3-14, the connecting part 3-13 and the pseudo coaxial line 3-15. As a result, in the high-frequency line connecting structure 3, a high-frequency signal can be transmitted without loss between the signal line end **3-4*a* of the coplanar strip line 3-14 and the signal line end 3-4*b* of the pseudo coaxial line 3-15**.

Fourth Example

Figure 14:
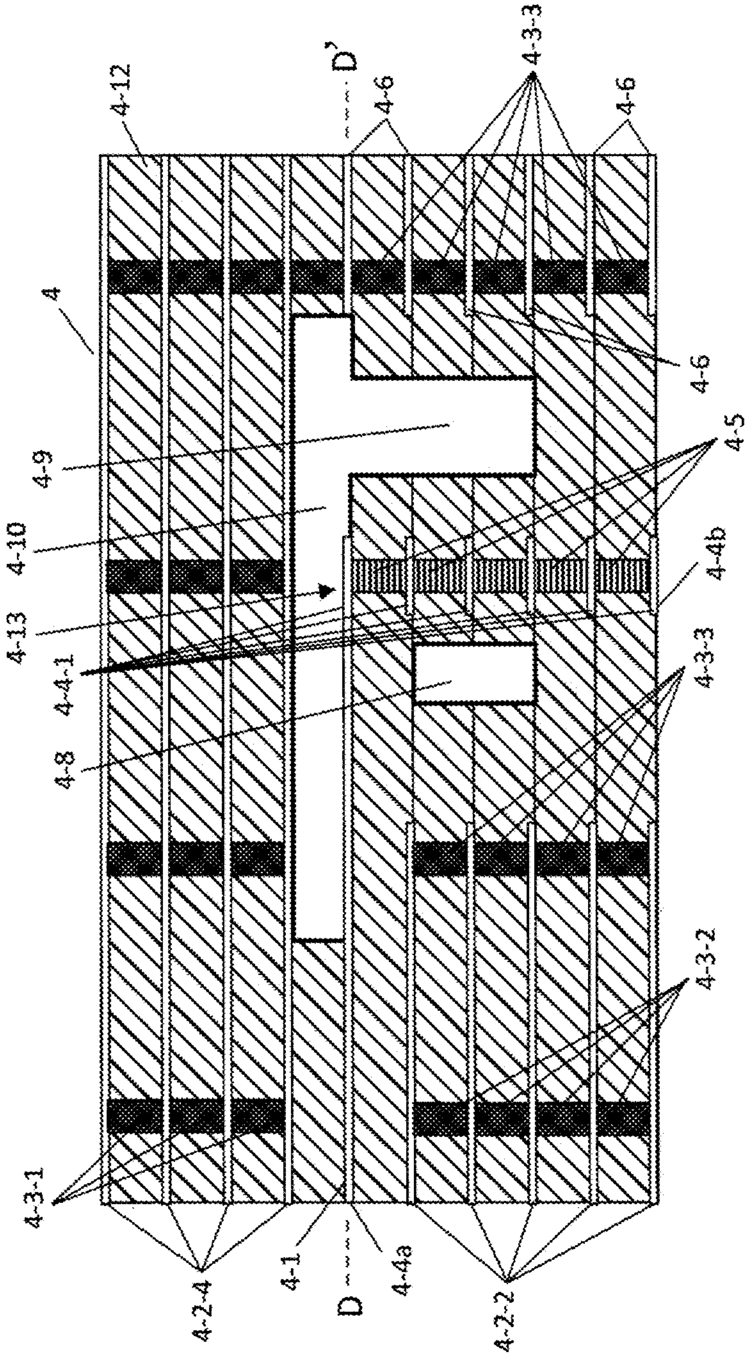
FIG. 14 is a cross-sectional view showing a configuration of a high-frequency line connecting structure according to a fourth example of the present invention.
Figure 15:
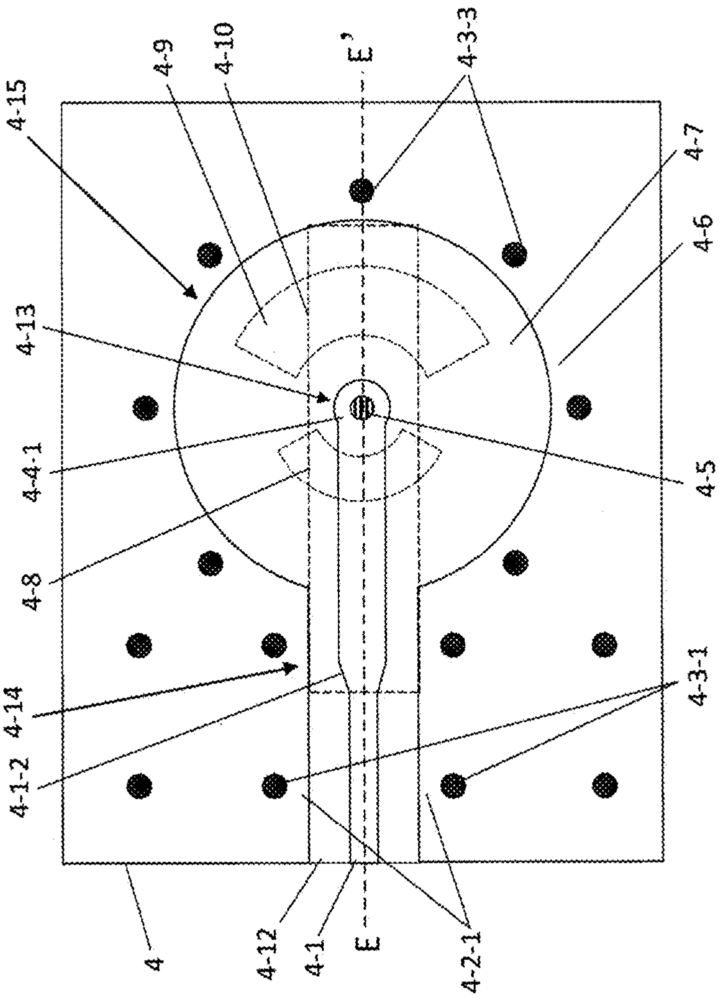
FIG. 15 is a cross-sectional view showing the configuration of the high-frequency line connecting structure according to the fourth example of the present invention.
Figure 16:
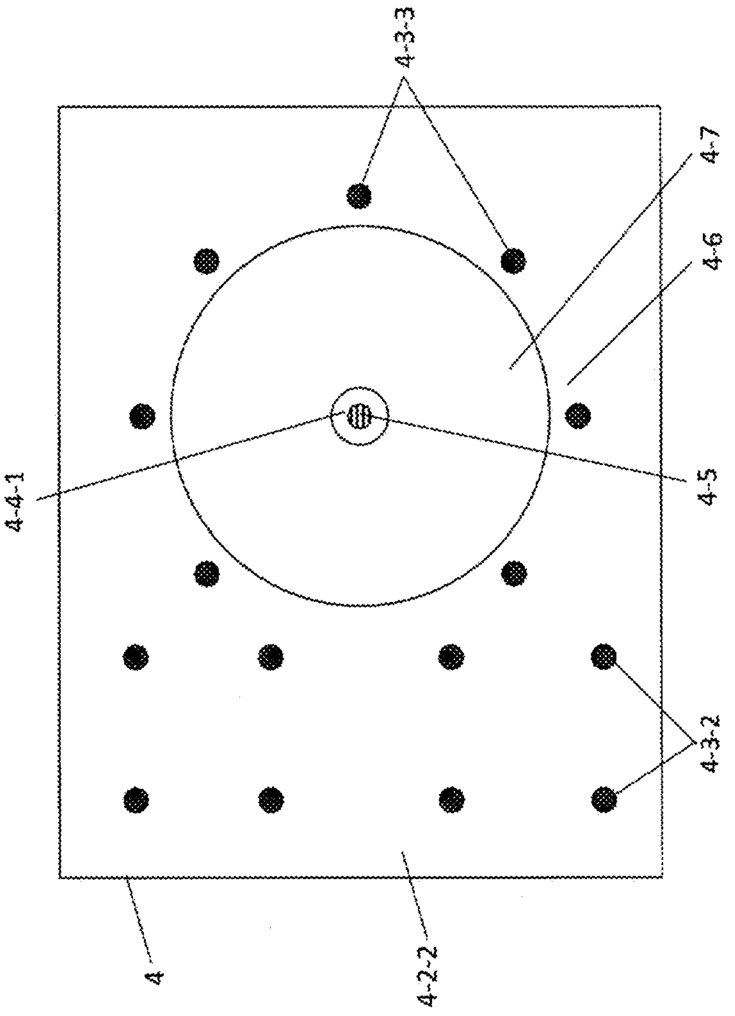
FIG. 16 is a bottom view showing the configuration of the high-frequency line connecting structure according to the fourth example of the present invention.

A high-frequency line connecting structure 4 according to a fourth example of the present invention will be described with reference to FIGS. 14 and 16. FIG. 14 is a cross-sectional view of the high-frequency line connecting structure 4, FIG. 15 is a cross-sectional view of the high-frequency line connecting structure 4 cut along a plane parallel to a layer (a layer at a position of a line D-D' of FIG. 14) on which the signal line 4-1 is formed, and FIG. 16 is a bottom view of the high-frequency line connecting structure 4. FIG. 14 shows a cross-section of the high-frequency line connecting structure 4 cut at the position of the line E-E' of FIG. 15.

The high-frequency line connecting structure 4 includes two high-frequency signal lines, specifically, a coplanar strip line 4-14 (first high-frequency line) and a pseudo coaxial line 4-15 (second high-frequency line).

The coplanar strip line 4-14 includes a signal line 4-1 made of a conductor formed in a substrate 4-12 made of an insulator, a ground plane 4-2-1 made of a conductor formed in right and left substrates 4-12 of the signal line 4-1, ground planes 4-2-4 and 4-2-2 made of a plurality of layers of conductors formed in the upper and lower substrates 4-12 of the signal line 4-1, a ground via 4-3-1 made of a conductor formed in the substrate 4-12 to interlayer-connect the plurality of layers of ground planes 4-2-1 and 4-2-4, and a ground via 4-3-2 made of a conductor formed in the substrate 4-12 to interlayer-connect the plurality of layers of ground planes 4-2-1 and 4-2-2 to each other. The material of the substrate 4-12 is, for example, alumina ceramics.

The pseudo coaxial line 4-15 includes a signal pad 4-4-1 made of a conductor formed in the substrate 4-12 to be connected to the signal line 4-1 and a plurality of layers of conductors thereunder, a signal via 4-5 made of a conductor formed in the substrate 4-12 to interlayer-connect the plurality of layers of signal pads 4-4-1 to each other, a ground plane 4-6 made of the plurality of layers of conductors formed in the substrate 4-12 around the signal pad 4-4-1 on the same layer as the ground planes 4-2-1 and 4-2-2, an anti-pad region 4-7 from which the ground plane 4-6 is selectively removed, and which is a region filled with the substrate 4-12, and a ground via 4-3-3 made of a conductor formed in the substrate 4-12 to interlayer-connect the plurality of layers of ground planes 4-6. A signal via 4-5 vertically penetrating the substrate 4-12 corresponds to a center conductor of the pseudo coaxial line 4-15.

The coplanar strip line 4-14 extends in the horizontal direction, and the pseudo coaxial line 4-15 extends in the vertical direction. Therefore, when the end of the coplanar strip line 4-14 and the end of the pseudo coaxial line 4-15 are electrically and physically connected, a connecting part 4-13 which bends the extension direction of the line is required at a place where the signal line 4-1 and the signal via 4-5 are connected.

In the second example described above, the upper portion of the region from the coplanar strip line 4-14 to the connecting part 2-13 is filled with the substrate 2-12, and there is no space.

On the other hand, in this example, a space 4-8 from which the substrate 4-12 is removed is formed in the substrate 4-12 on the inner peripheral side of the connecting part 4-13. A space 4-9 from which the substrate 4-12 is removed is formed in the substrate 4-12 on the outer peripheral side of the connecting part 4-13.

Further, in this example, a space 4-10, from which the substrate 4-12 above the signal pad 4-4-1 connected to the signal line 4-1, and the substrate 4-12 above the signal line 4-1 are removed, is formed. The signal line 4-1 and the signal pad 4-4-1 on the side of the signal via 4-5 are exposed in the space 4-10. The inside of the spaces 4-8 to 4-10 is filled with air or an inert gas such as $N_2$. Further, an insulator or a semi-insulating semiconductor may be filled in the spaces 4-8 to 4-10 as described later.

The total volume of the space 4-8 on the inner peripheral side is formed to be smaller than the total volume of the spaces 4-9 and 4-10 on the outer peripheral side. In the examples shown in FIGS. 14 and 15, the spaces 4-9 and 4-10 are formed to communicate with each other, but the spaces 4-9 and 4-10 may be formed not to communicate with each other.

Further, in this example, a tapered part 4-1-2 whose width gradually increases as approaching the signal via 4-5 is provided in the middle of the signal line 4-1, and the width of the signal line 4-1 on the side close to the signal via 4-5 is made wider than that of the signal line 4-1 on the side far from the signal via 4-5. The reason for widening the width of the signal line 4-1 on the side close to the signal via 4-5 is for characteristic impedance matching.

According to the above-described configuration, this example can further suppress the reduction in impedance due to the increase in the electrical capacitance developed in the connecting part 4-13, and can also realize a broadband of the reflection frequency of the high-frequency signal due to the LC resonance generated in the connecting part 4-13.

In the electromagnetic field distribution that can be propagated through the pseudo coaxial line 4-15, propagation through the signal via 4-5 is not necessarily limited to the basic mode. There is also a waveguide propagation mode when the ground plane 4-6 and the ground via 4-3-3 constituting the pseudo coaxial line 4-15 are regarded as metal walls.

Since the signal pad 4-4-1 and the ground plane 4-6 are spatially separated from each other, the signal line 4-1 in the anti-pad region 4-7 to be the extension destination of the coplanar strip line 4-14 is easily electromagnetically coupled with a peripheral neighboring ground plane, and this coupling can be a cause of a waveguide propagation mode which is not originally desired. It is also possible to suppress this electromagnetic coupling in this example. That is, in this example, the excitation of the higher-order waveguide mode in the pseudo coaxial line 4-15 is suppressed, and the leakage of the electromagnetic field to the outer peripheral side can also be suppressed by forming the space 4-10.

Therefore, in this example, the matching of the characteristic impedance can be realized over the entire coplanar strip line 4-14, the connecting part 4-13 and the pseudo coaxial line 4-15, without developing the waveguide propagation mode in the pseudo coaxial line 4-15 which is originally unnecessary. As a result, in the high-frequency line connecting structure 4, a high-frequency signal can be transmitted without loss between the signal line end **4-4*a* of the coplanar strip line 4-14 and the signal line end 4-4*b* of the pseudo coaxial line 4-15**.

It is clear that the present invention is not limited to the first to fourth examples described above, and many modifications and combinations can be implemented by those skilled in the art within the technical concept of the present invention.

For example, the connecting parts 1-13, 2-13, 3-13, and 4-13 for bending the extension direction of the line may be formed in a step shape instead of a shape in which the extension direction bends at right angles, or may have a shape with one or more vertexes which are not at right angles.

In addition, although the pseudo coaxial lines 2-15, 3-15, and 4-15 have a structure in which the signal pads 2-4-1, 3-4-1, and 4-4-1 and the signal vias 2-5, 3-5, and 4-5 and the anti-pad regions 2-7, 3-7, and 4-7 have a circular shape in a plan view, and centers of the signal pads 2-4-1, 3-4-1, and 4-4-1, centers of the signal vias 2-5, 3-5, and 4-5, and centers of the anti-pad regions 2-7, 3-7, and 4-7 coincide with each other, it goes without saying that there is no need to be bound by these structures.

For example, the center of the signal pads 2-4-1, 3-4-1, and 4-4-1, and the center of the signal vias 2-5, 3-5, and 4-5 need not be matched with the center of the anti-pad regions 2-7, 3-7, and 4-7, and can be changed to a desired position in the anti-pad regions 2-7, 3-7, and 4-7 from the viewpoint of characteristic impedance matching.

The anti-pad regions 2-7, 3-7, and 4-7 do not need to be true circles in a plan view. For example, the anti-pad regions 2-7, 3-7, and 4-7 may be formed into an elliptical shape in a plan view or a rectangular shape in a plan view.

In the first to fourth examples, the materials of the substrates 1-2, 2-12, 3-12, and 4-12 are alumina ceramics, but it is needless to say that the materials are not necessarily limited thereto. For example, aluminum nitride, zirconia or the like can be used as a ceramic material, and quartz glass or low melting point glass that is an inorganic material may be used. As the material of the substrates 1-2, 2-12, 3-12, and 4-12, a resin or Teflon (registered trademark) which is an organic material may be used. Further, a semi-insulating semiconductor can also be used, and for example, high-resistance Si, semi-insulating GaAs or InP may be used.

In the first to fourth examples, although spaces 1-5, 1-6, 2-8, 2-9, 3-8 to 3-10, and 4-8 to 4-10 are formed on both the inner peripheral side and the outer peripheral side of the connecting parts 1-13, 2-13, 3-13, and 4-13, a space may be formed only on the outer peripheral side When the number of spaces on the inner peripheral side and the outer peripheral side of the connecting parts 1-13, 2-13, 3-13, and 4-13 is M (M is an integer of 1 or more) and the number of spaces on the outer peripheral side is N (N is an integer of 1 or more), the relation of M≤N may be satisfied. When spaces are formed on both the inner peripheral side and the outer peripheral side of the connecting parts 1-13, 2-13, 3-13, and 4-13, as described above, the total volume of the space on the inner peripheral side may be made smaller than the total volume of the space on the outer peripheral side.

In the first to fourth examples, the inside of the spaces 1-5, 1-6, 2-8, 2-9, 3-8 to 3-10, and 4-8 to 4-10 was filled with air or an inert gas such as $N_2$. As another structural example, a material having a relative dielectric constant lower than that of the substrates 1-2, 2-12, 3-12, and 4-12 may be filled in the spaces 1-5, 1-6, 2-8, 2-9, 3-8 to 3-10, and 4-8 to 4-10. Such a material is an insulator or a semi-insulating semiconductor.

When spaces are formed on both the inner peripheral side and the outer peripheral side of the connecting parts 1-13, 2-13, 3-13, and 4-13, it is desirable that the dielectric constant of the insulator or the semi-insulating semiconductor filled in the space on the outer peripheral side be smaller than that of the insulator or the semi-insulating semiconductor filled in the space on the inner peripheral side.

Further, in the third example, although the space 3-9 and the space 3-10 on the outer peripheral side of the connecting part 3-13 are formed to communicate with each other, the space 3-9 and the space 3-10 may be formed separately from each other. Similarly, in the fourth example, although the space 4-9 and the space 4-10 on the outer peripheral side of the connecting part 4-13 are formed to communicate with each other, the space 4-9 and the space 4-10 may be formed separately from each other.

In the first to fourth examples, although the shapes of circular arcs and polyhedrons are exemplified as the shapes of the spaces 1-5, 1-6, 2-8, 2-9, 3-8 to 3-10, and 4-8 to 4-10, these shapes are not essential. It is needless to say that shapes reflecting various manufacturing processes can be applied as the shapes of the spaces 1-5, 1-6, 2-8, 2-9, 3-8 to 3-10, and 4-8 to 4-10.

In the first to fourth examples, spaces in the substrates 1-2, 2-12, 3-12, and 4-12 may be formed to be in contact with the ground plane (formed so that the ground plane is exposed in the space) around at least one of the first high-frequency line and the second high-frequency line. The space may be formed at a position adjacent to the ground plane via the substrates 1-2, 2-12, 3-12, and 4-12. These spaces function as capacitive adjustment parts.

In the first to fourth examples, spaces in the substrates 1-2, 2-12, 3-12, and 4-12 may be formed to be in contact with the signal line (formed so that the signal line is exposed in the space) around at least one of the first high-frequency line and the second high-frequency line. Further, the space may be formed at a position adjacent to the signal line via the substrate. These spaces function as an inductive adjustment part.

INDUSTRIAL APPLICABILITY

Embodiments of the present invention can be applied to the technique of connecting high-frequency lines with different extension directions.

Reference Signs List

| Reference Signs List | |
|---|---|
| 1, 2, 3, 4 | High-frequency line connecting structure |
| 1-1a, 1-1b, 2-1, 3-1, 4-1 | Signal line |
| 1-13, 2-13, 3-13, 4-13 | Connecting part |
| 1-2, 2-12, 3-12, 4-12 | Substrate |
| 1-3, 2-2-1, 2-2-2, 2-2-4, 2-6, 3-2-1, 3-2-2, 3-2-4, 3-6, 4-2-1, 4-2-2, 4-2-4, 4-6 | Ground plane |
| 1-5, 1-6, 2-8, 2-9, 3-8 to 3-10, 4-8 to 4-10 | Space |
| 1-14, 1-15 | Microstrip line |
| 2-4-1, 3-4-1, 4-4-1 | Signal pad |
| 2-5, 3-5, 4-5 | Signal via |
| 2-7, 3-7, 4-7 | Anti-pad region |
| 2-3-1, 2-3-2, 2-3-3, 3-3-1, 3-3-2, 3-3-3, 4-3-1, 4-3-2, 4-3-3 | Ground Via |
| 2-14, 3-14, 4-14 | Coplanar strip line |
| 2-15, 3-15, 4-15 | Quasi-coaxial line |
| 4-1-2 | Tapered part |

-continued

The invention claimed is:

1. A structure comprising:

a substrate comprising a multilayer structure including a first plurality of layers, the first plurality of layers being stacked perpendicular to a surface of the substrate, each of the first plurality of layers being made of an insulator or a semi-insulating semiconductor;

a first high-frequency line disposed in the substrate, the first high-frequency line being disposed in a first layer of the first plurality of layers;

a second high-frequency line disposed in the substrate, the second high-frequency line having an extension direction different from an extension direction of the first high-frequency line, the second high-frequency line extending through the first plurality of layers; and a connecting part connecting the first high-frequency line to the second high-frequency line and comprising a bend in an extension direction of the connecting part, wherein the substrate defines N first spaces on an outer peripheral side of the connecting part, and M second spaces on an inner peripheral side of the connecting part, wherein the N first spaces and the M second spaces are formed by removing a part of the substrate, wherein M and N are each an integer of 1 or more, wherein a relationship MEN is satisfied, and wherein the N first spaces and the M second spaces expose a ground plane or are disposed at a position adjacent to the ground plane, the ground plane being disposed in the substrate around at least one of the first high-frequency line or the second high-frequency line, and the ground plane is configured to function as a capacitive adjustment circuit.

2. A structure comprising:

a substrate comprising a multilayer structure including a first plurality of layers, the first plurality of layers being stacked perpendicular to a surface of the substrate, each of the first plurality of layers being made of an insulator or a semi-insulating semiconductor;

a first high-frequency line disposed in the substrate, the first high-frequency line being disposed in a first layer of the first plurality of layers;

a second high-frequency line disposed in the substrate, the second high-frequency line having an extension direction different from an extension direction of the first high-frequency line, the second high-frequency line extending through the first plurality of layers; and a connecting part connecting the first high-frequency line to the second high-frequency line and comprising a bend in an extension direction of the connecting part, wherein the substrate defines N first spaces on an outer peripheral side of the connecting part, and M second spaces on an inner peripheral side of the connecting part, wherein the N first spaces and the M second spaces are formed by removing a part of the substrate, wherein M and N are each an integer of 1 or more, wherein a relationship MEN is satisfied, and wherein the N first spaces and the M second spaces expose at least one of the first high-frequency line or the second high-frequency line or are disposed at a position adjacent to at least one of the first high-frequency line or the second high-frequency line, and the N first spaces and the M second spaces are configured to provide an inductive adjustment.

3. A structure comprising:

a substrate comprising a multilayer structure including a first plurality of layers, the first plurality of layers being stacked perpendicular to a surface of the substrate, each of the first plurality of layers being made of an insulator or a semi-insulating semiconductor;

a first high-frequency line disposed in the substrate, the first high-frequency line being disposed in a first layer of the first plurality of layers;

a second high-frequency line disposed in the substrate, the second high-frequency line having an extension direction different from an extension direction of the first high-frequency line, the second high-frequency line extending through the first plurality of layers; and a connecting part connecting the first high-frequency line to the second high-frequency line and comprising a bend in an extension direction of the connecting part, wherein the substrate defines N first spaces on an outer peripheral side of the connecting part, and M second spaces on an inner peripheral side of the connecting part, wherein the N first spaces and the M second spaces are formed by removing a part of the substrate, wherein M and N are each an integer of 1 or more; and a relationship MEN is satisfied.

4. The structure according to claim 3, wherein:

a total volume of the M second spaces is smaller than a total volume of the N first spaces.

5. The structure according to claim 3, wherein the first high-frequency line and the second high-frequency line are any one of a microstrip line, a coplanar line, or a strip line.

6. The structure according to claim 3, wherein:

the first high-frequency line is a strip line; and the second high-frequency line is a pseudo-coaxial line comprising a signal via that penetrates the substrate and a ground plane surrounding the signal via; and the substrate fills a gap between the signal via and the ground plane.

7. The structure according to claim 6, wherein:

the M second spaces expose the ground plane or are disposed at a position adjacent to the ground plane;

the ground plane is disposed in the substrate around both signal lines of the first high-frequency line and the second high-frequency line; and the N first spaces expose the first high-frequency line at a position adjacent to the second high-frequency line via the substrate.

8. The structure according to claim 3, wherein the N first spaces and the M second spaces are filled with an insulator having a dielectric constant smaller than a dielectric constant of the substrate or filled with a semi-insulating semiconductor having a dielectric constant smaller than the dielectric constant of the substrate.

9. The structure according to claim 3, wherein:

the N first spaces are filled with a first insulator having a dielectric constant smaller than a dielectric constant of the substrate or filled with a first semi-insulating semiconductor having a dielectric constant smaller than the dielectric constant of the substrate;

the M second spaces are filled with a second insulator having a dielectric constant smaller than a dielectric constant of the substrate or filled with a second semi-insulating semiconductor having a dielectric constant smaller than the dielectric constant of the substrate; and the dielectric constant of the first insulator or the dielectric constant of the first semi-insulating semiconductor in the N first spaces is smaller than the dielectric constant of the second insulator or the dielectric constant of the second semi-insulating semiconductor in the M second spaces.

10. The structure according to claim 3, wherein the M second spaces are formed by removing a part of a second layer of the first plurality of layers, and the second layer is different from the first layer in which the first high-frequency line is disposed.

* * * * *